US006687675B1

(12) United States Patent
Archambeau

(10) Patent No.: US 6,687,675 B1
(45) Date of Patent: Feb. 3, 2004

(54) MESSAGE STORAGE DEVICE

(76) Inventor: Lurley Archambeau, 2214 River Rd., Maumee, OH (US) 43537

( * ) Notice: Subject to any disclaimer, the term of this patent is extended or adjusted under 35 U.S.C. 154(b) by 417 days.

(21) Appl. No.: 09/584,228

(22) Filed: May 31, 2000

Related U.S. Application Data

(60) Provisional application No. 60/137,543, filed on Jun. 4, 1999.

(51) Int. Cl.$^{7}$ ................................................ G01L 21/00

(52) U.S. Cl. ........................ 704/273; 704/272; 704/270; 704/258; 704/276; 434/169

(58) Field of Search ................................ 704/270–275, 704/200, 201, 258, 276; 434/169

(56) References Cited

U.S. PATENT DOCUMENTS 4,622,768 A * 11/1986 Moreau ................... 40/124.11
4,864,658 A * 9/1989 Russell et al. ................. 2/160
5,081,852 A 1/1992 Cox
5,134,724 A 7/1992 Gehring et al.
5,279,514 A * 1/1994 Lacombe et al. ........... 446/297
5,365,686 A * 11/1994 Scott ........................... 40/455
5,588,678 A * 12/1996 Young ........................ 704/272
5,641,164 A * 6/1997 Doederlein et al. ......... 273/237
5,768,680 A 6/1998 Thomas
5,855,001 A * 12/1998 Doederlein et al. ......... 704/270
5,877,742 A 3/1999 Klink
6,068,485 A * 5/2000 Linebarger et al. ......... 434/116
6,292,780 B1 * 9/2001 Doederlein et al. ......... 704/270

* cited by examiner

*Primary Examiner*—Vijay Chawan
(74) *Attorney, Agent, or Firm*—MacMillan, Sobanski & Todd; Donald R. Fraser

(57) ABSTRACT

A portable device for displaying an image and generating an associated audible message to a user includes a compartment having an area for visually displaying an image to a user and a system for generating an audio message associated with the image from stored audio information. The system includes a memory for storing the audio information, a speech synthesizer and a speaker for converting the audio information to the audio message and a microprocessor connected between the memory and the speech synthesizer for controlling the generation of the audio message.

20 Claims, 3 Drawing Sheets

MESSAGE STORAGE DEVICE

CROSS-REFERENCE TO RELATED APPLICATION

This application claims the benefit of U.S. provisional patent application Ser. No. 60/137,543, filed Jun. 4, 1999.

BACKGROUND OF THE INVENTION

The invention relates to a portable device for storing information and selectively generating visual displays and/or audible messages from the stored information. The device may be worn by a user and can be configured to prevent or discourage the unwearing of the device to achieve at least a modicum of permanency and placement as desired and appropriate.

A well-known device for carrying a picture of a loved one on your person is a locket having an inner compartment for storing a photograph. However, the typical locket is formed as a pair of hinged hollow bodies secured together by a clasp so that the photograph is not visible unless the locket is opened.

Also known are various portable radios, cassette tape players and CD players for audio reproduction of music and spoken words. Portable miniature televisions having a LCD display also are available. Such devices can be provided with a carrying strap or belt fastener for hands free transportation.

SUMMARY OF THE INVENTION

In one form, the device according present invention can include a compartment with a transparent cover for storing and displaying information in the form of a photograph or textual message, for example. Associated with the compartment is a digital storage and audio reproduction circuit for selectively generating audio information in the form of a spoken message or music, for example. In another form, a display screen and circuit for generating static or moving visual displays can replace the compartment.

One use of the device is for displaying an image of a friend or loved one and generating an associated audio message. Another use is for displaying the image of an entertainment figure and generating associated music or spoken messages.

It is oftentimes the objective of the trained professional or other care provider to repeat a particular message to a patient or service recipient during a period of recovery from a medical or mental condition, for example. The message can range from the trivial to the profound, but nevertheless, must be repeated. Since such a message can be readily conveyed orally from a psychiatrist to a patient during office consultation, for example, such reinforcement on a daily basis, for example, may be impractical or impossible.

It is an object of this invention to provide a method and system for reinforcing a therapeutic or behavior influencing message to a patient or consumer during a period of therapeutic treatment or behavioral changes.

The above as well as other objects of the invention may be readily achieved by a system for generating an audible prerecorded message to a patient or consumer during therapeutic treatment or behavior influencing comprising:

a compartment having an area for visually displaying an image to a user and including a transparent cover over the area for enclosing the image;

a system adjacent said compartment for generating an audio message associated with the image from stored audio information, the system including a memory for storing the audio information representing the message;

a speech synthesizer and a speaker in the system for converting the audio information to the audio message; and a microprocessor in the system connected between the memory and the speech synthesizer for controlling the generation of the audio message.

BRIEF DESCRIPTION OF THE DRAWINGS

Other objects and advantages of the invention will become manifest to those skilled in the art from reading the following description of an embodiment of the invention when considered in the light of the accompanying drawings, in which.

DETAILED DESCRIPTION OF THE ILLUSTRATED EMBODIMENT

Figure 1:
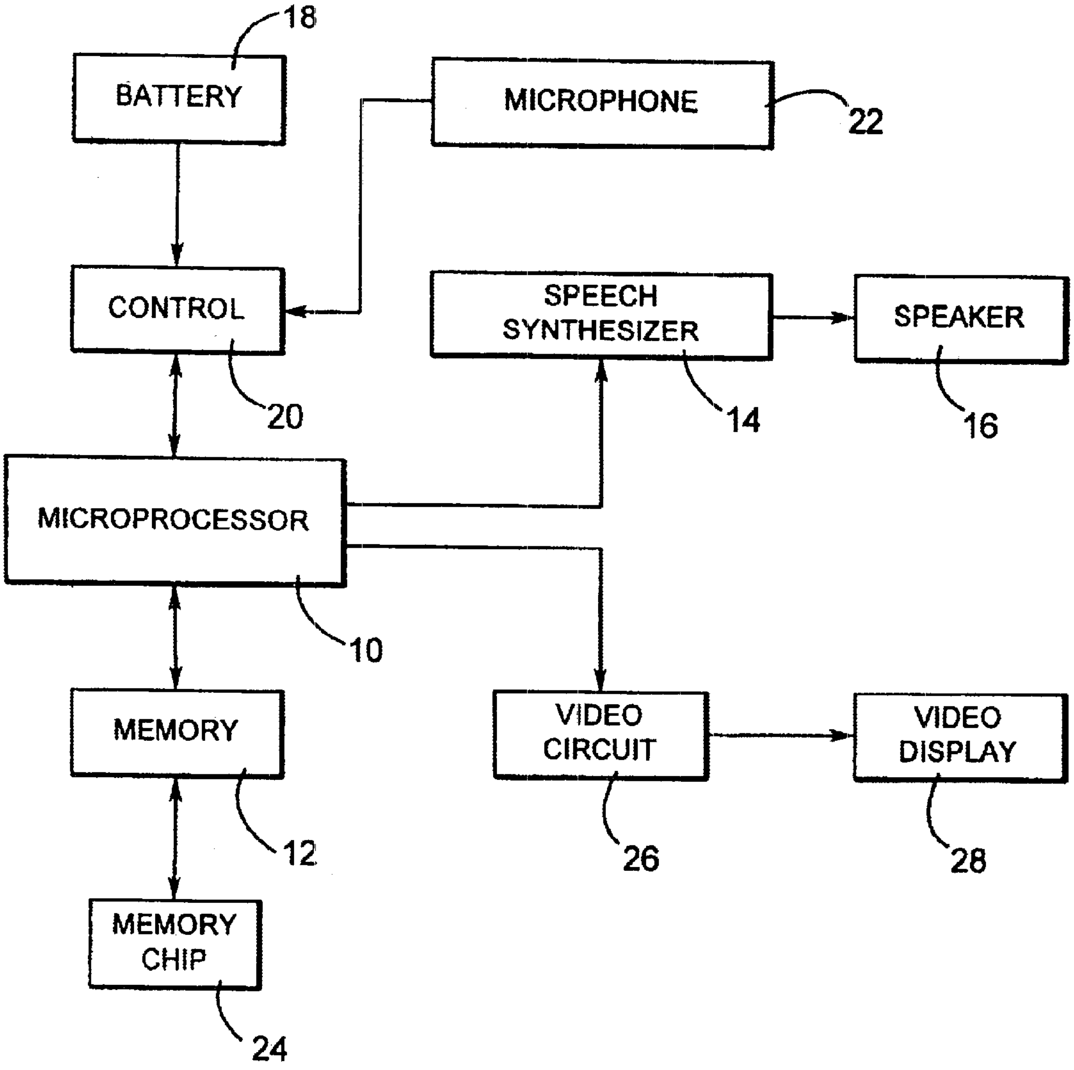
FIG. 1 is a schematic illustration of a system for achieving the objectives of the present invention.

Referring to the drawings, there is illustrated a schematic block diagram of a system for generating an audible message including a microprocessor 10 which is coupled to a memory 12. The microprocessor 10 is also coupled to a speech synthesizer 14 and an associated speaker 16. Power for the system is provided by a suitable source, such as a battery 18, connected to a control 20 which is connected to the microprocessor.

In operation, a message stored in the memory 12 may be processed by the microprocessor 10 after being activated by the control 20 and the associated source of power 18. The output of the microprocessor 10 is fed to the speech synthesizer 14 and finally to the speaker 16. The speaker 16 emits the audible message that has been stored in the memory 12.

The message can be in the form of digital data stored in the memory 12. A microphone 22 can be connected to the control 20 so that audio information can be inputted into the device and converted to digital form by the microprocessor 10 before being stored in the memory 12 as the message. The memory 12 can include a replaceable chip 24 having predetermined digital data stored therein such that the message can be changed by replacing the chip.

Video information also can be stored in the memory 12 and/or the chip 24. A video circuit 26 connected to the microprocessor 10 converts the stored digital information into an image that is visible on a video display 28 such as an LCD unit. The image can be static, like a photograph, or dynamic, like a video tape or television broadcast.

The audio message and the visual information can be of any desired type. For example, the message can be personal related to a friend or family member. The message can be entertaining such as music or speech by a singer or actor.

The emitted message could be therapeutic. A message to a recovering alcoholic or addict, for example, to avoid the addiction behavior or taking a drink of an alcoholic beverage. The message could be from a child, spouse, clergy, or friend of the patient. This message is intended influence behavior to health and to reinforce the oral message given by the patient's psychiatrist or care providers.

Figure 2:
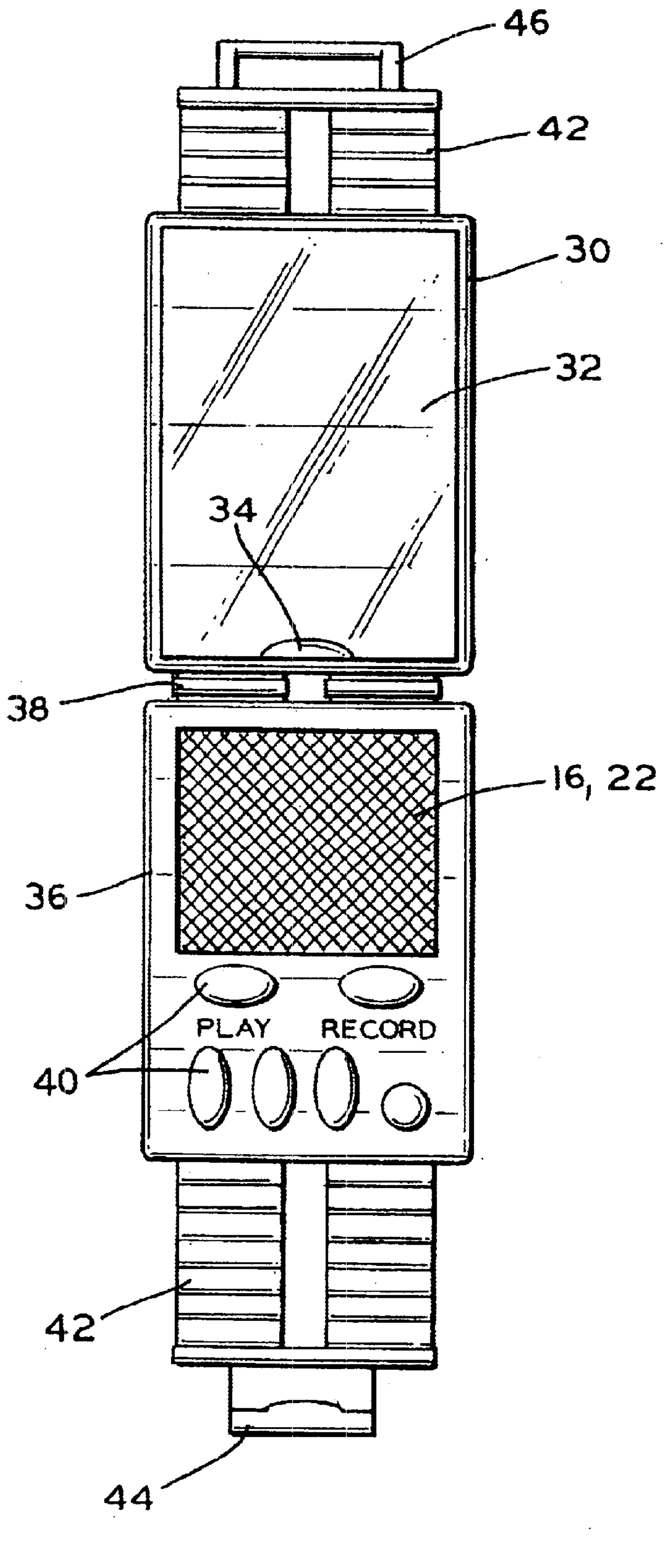
FIG. 2 is a top plan view of a bracelet including the system illustrated in FIG. 1.

In order to discourage the avoidance of the message, the patient will be caused to wear a bracelet, for example, as illustrated in FIG. 2.

The device illustrated in FIG. 2 consists of a bracelet including a compartment 30 having an optically transparent cover 32. The cover 32 may be provided with an opener notch 34 to facilitate the opening of the compartment to insert a message, photograph, or other indicia, considered to be useful in the therapeutic treatment of the wearer.

The device further includes an adjacent compartment 36 connected to the compartment 30 by means of flexible hinged link or other connection connector links 38. The compartment 36 is adapted to house the system illustrated in FIG. 1 capable of an audio message output. It will be understood that the video portion of the system could also be located in the compartment 30, the compartment 36, or another similar compartment forming the bracelet.

Various control buttons 40 are employed and are associated with the control 20. These control buttons 40 include the means for playing the recorded message; means for actuating a recording function for input from the microphone 22; and volume and other control functions.

The device also includes additional spacer links 42 or other adjustments to adjust for the size of the wearer; and also clasp mechanism 44, 46. The clasp mechanism 44, 46 can function as a tamperproof latching mechanism to discourage removal of the device.

The same mechanism could be incorporated in the pendant, fob, pin, or the like.

Figure 3:
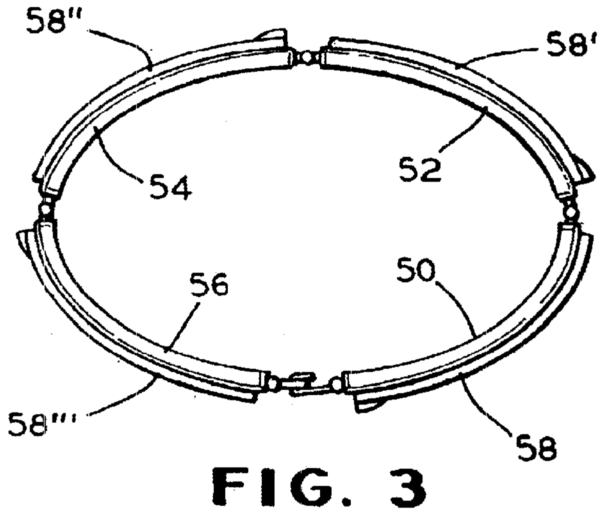
FIG. 3 is a side elevation view of a bracelet including a plurality of compartments for storing various messages.
Figure 4:
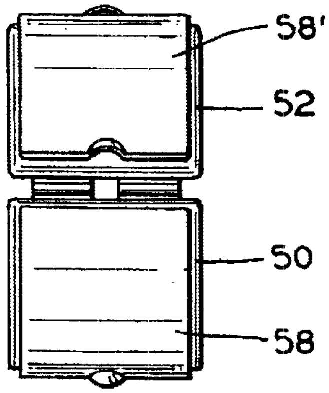
FIG. 4 is a front elevation view of the bracelet illustrated in FIG. 3.

Another form of the bracelet is illustrated in FIGS. 3 and 4 wherein there is illustrated a bracelet formed of four individual compartments 50, 52, 54, 56. The compartments 50, 52, 54, 56 are substantially identical with each other and each includes an optical transparent cover 58, 58', 58", 58'", respectively. The covers are each provided with an opener notch to facilitate the opening thereof to insert a desired message. The covers are further provided with suitable hinges. Suitable connector links are employed to couple adjacent compartments.

The bracelet is closed into a locked condition by a suitable clasp mechanism which will function to discourage the unclasping of the bracelet after the messages or indicia is inserted into the compartments.

Figure 5:
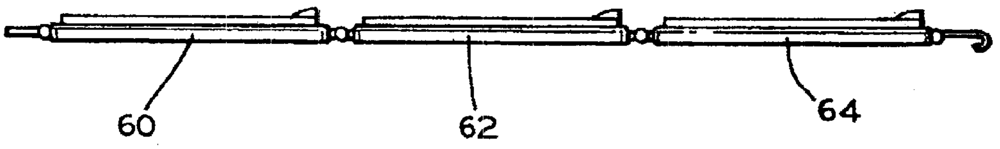
FIG. 5 is a side elevation view of an embodiment similar to that illustrated in FIGS. 3 and 4 wherein the bracelet is open and includes three compartments.

The embodiment illustrated in FIG. 5 is similar to that illustrated in FIGS. 3 and 4 except the embodiment illustrates a bracelet having only three compartments 60, 62, 64.

The compartments 30, 36, 50, 52, 54, 56, 60, 62, 64 can be formed of any suitable material such as metal or plastic.

It should be understood that the embodiment of the invention employing a lockable clasping means is intended to prevent or discourage the simple unwearing of the system to ensure a degree of permanency and placement as desired and appropriate.

The space within the individual compartments may be used for the placement of indicia such as a photograph, picture, written text, or any other materials visible to the wearer.

Another feature of the invention dealing with the desire for prolonged use of the system includes the formation of the optically transparent cover with means to cause breakage of the cover should an attempt be made to open the cover after the initial insertion of indicia.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. A portable device for displaying an image and generating an associated audible message to deliver therapeutic treatment to a user wearing the device comprising:

at least one compartment with an area for visually displaying an image;

a system for generating an audio message associated with the image from stored audio information, said system including a memory for storing the audio information representing the audio message; and a tamperproof means for clasping said at least one compartment and said system to a wrist of a user whereby when said at least one compartment and said system are clasped to the wrist of the user, an image related to a therapeutic treatment is displayed in said area and an associated audio message is generated by said system, the user receives the therapeutic treatment by viewing the image and hearing the audio message and said tamperproof means discourages the user from removing said at least one compartment and said system from the wrist.

2. The device according to claim 1 wherein said at least one compartment includes a transparent cover over said area for enclosing the image.

3. The device according to claim 1 including a video display located in said area for displaying the image.

4. The device according to claim 1 wherein said memory stores digital information representing the image and including a video circuit connected between said memory and said video display for converting the digital information to video information.

5. The device according to claim 4 including a microprocessor connected between said memory and said video circuit for controlling said conversion of the digital information.

6. The device according to claim 1 wherein said memory includes a replaceable memory chip for changing the stored audio information.

7. The device according to claim 1 wherein said system includes a speech synthesizer and a speaker for converting the stored audio information to the audio message.

8. The device according to claim 7 including a microprocessor connected between said memory and said speech synthesizer for controlling said generation of the audio message.

9. The device according to claim 1 wherein said system includes a microphone for inputting the audio information into said memory.

10. The device according to claim 1 wherein said at least one compartment is a portion of a bracelet and tamperproof means clasps said bracelet about the wrist of the user.

11. The device according to claim 1 including a second compartment connected to said at least one compartment and wherein said system is housed in said second compartment.

12. A portable device for displaying an image and generating an associated audible message to deliver therapeutic treatment to a user of the device comprising:

a bracelet having an area for visually displaying an image to a user;

an image in said area and being related to a therapeutic treatment;

a system included in said bracelet for generating an audio message associated with said image from stored audio information, said system including a memory storing said audio information representing said audio message; and a tamperproof means for clasping said bracelet to an arm of a user whereby the user receives the therapeutic treatment by viewing said image and hearing said audio message.

13. The device according to claim 12 wherein said bracelet includes a transparent tamperproof cover over said area for enclosing said image.

14. The device according to claim 12 wherein said system includes a microphone for inputting said audio information into said memory.

15. A portable device for displaying an image and generating an associated audible message to deliver therapeutic treatment to a user of the device comprising:

a bracelet having at least one compartment with an area for visually displaying an image;

a system for generating an audio message associated with the image from stored audio information, said system including a memory for storing the audio information representing the audio message, said system being housed in said bracelet; and a means for clasping said bracelet to a wrist of a user whereby when said bracelet is clasped to the wrist of the user, an image related to a therapeutic treatment is displayed in said area and an associated audio message is generated by said system, the user receives the therapeutic treatment by viewing the image and hearing the audio message.

16. The device according to claim 15 wherein said at least one compartment includes a transparent cover over said area for enclosing the image.

17. The device according to claim 15 wherein said memory includes a replaceable memory chip for changing the stored audio information.

18. The device according to claim 15 wherein said system includes a microphone for inputting the audio information into said memory.

19. The device according to claim 15 wherein said means for clasping is a tamperproof latching mechanism.

20. The device according to claim 15 including a second compartment connected to said at least one compartment and wherein said system is housed in said second compartment.

* * * * *